March 19, 1963 G. P. MATHEWS ETAL 3,081,844
BRAKE
Filed July 28, 1959 2 Sheets-Sheet 1

INVENTORS
GEORGE P. MATHEWS
CHARLES W. NEHR
BY
Strauch, Nolan + Neale
ATTORNEYS

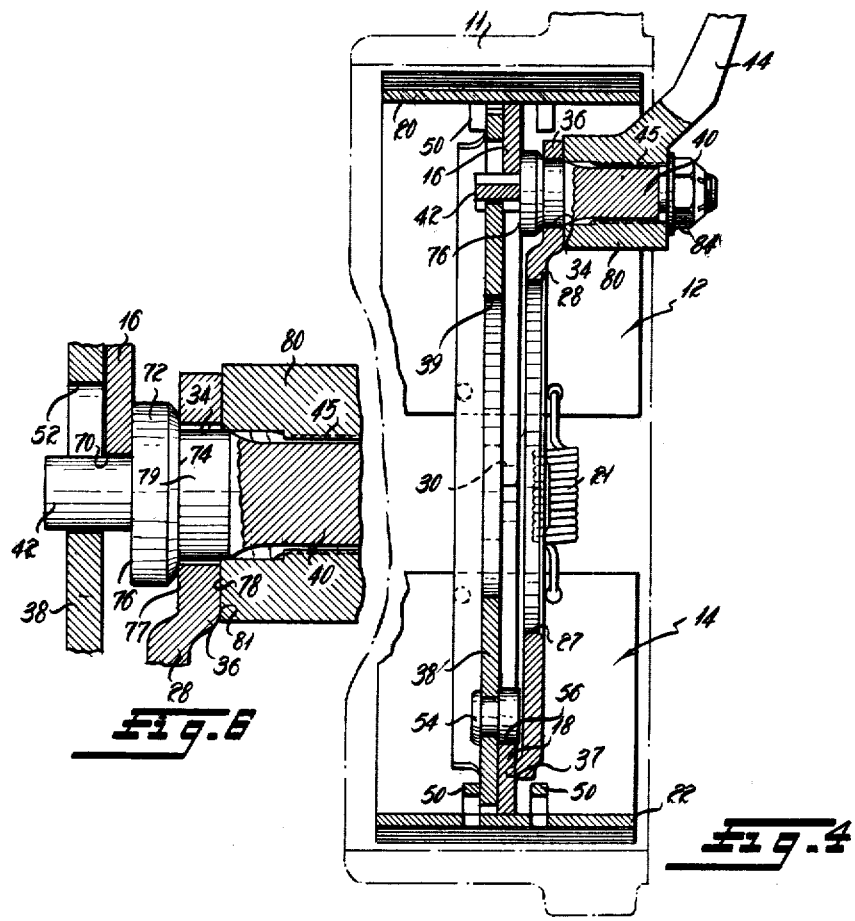
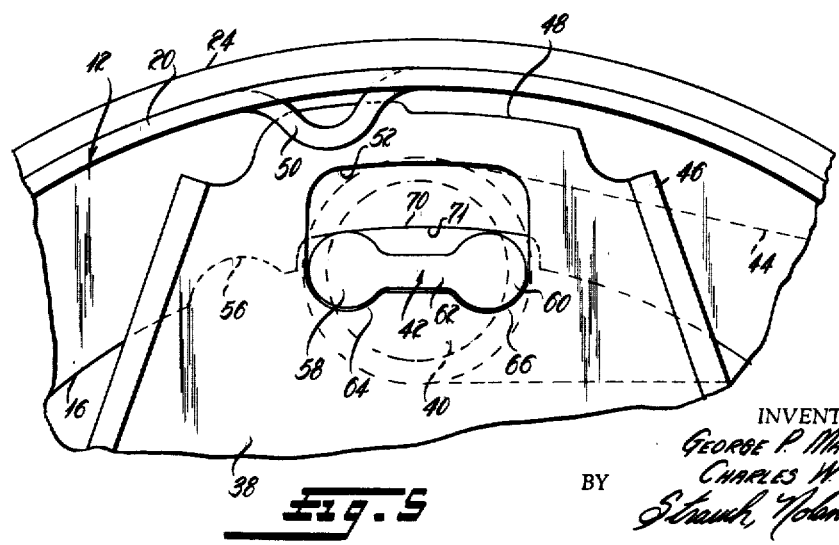

United States Patent Office 3,081,844
Patented Mar. 19, 1963

3,081,844
BRAKE
George P. Mathews and Charles W. Nehr, Ashtabula, Ohio, assignors to Rockwell-Standard Corporation, Coraopolis, Pa., a corporation of Pennsylvania
Filed July 28, 1959, Ser. No. 830,042
11 Claims. (Cl. 188—78)

This invention relates to brake mechanisms and especially to mechanically simple efficient brake mechanisms of the internal expanding type particularly such as used in automotive vehicle applications.

The brake construction of this application contemplates an internal expanding brake providing full floating brake shoes with balanced braking action which is substantially equally effective for either forward or reverse rotation of the brake drum.

The present invention provides a cam actuated brake in which the mechanical advantage, which is made up of the cam ratio and lever length, is limited only by the vehicle's brake actuation equipment, permitting a relatively large braking output to be obtained from a given input. A further improvement resides in the fact that the brake actuation is non-directional; that is, the cam can be rotated clockwise or counter-clockwise to actuate the brake, incorporating the same parts. No internal adjustment to compensate for brake lining wear need be provided; and excessive lining clearance can be eliminated by adjusting the external actuation linkage fastened to the camshaft lever.

The preferred embodiment of this brake construction requires only a few components, which almost entirely can be made of lightweight and inexpensive steel stampings, and which include a brake drum, a simplified backing plate with riveted-on pivot pins to provide shoe abutments, two brake shoes with integral strut aligning projections, a floating strut with riveted-on force transmitting button, two return springs, one camshaft with integral cam, and a camshaft lever.

The present invention provides highly efficient brake shoe actuation resulting in a greater brake output from a given input than a conventional mechanical lever-cam brake. A balanced application of braking forces on both shoes is retained at all times in both directions of rotation of the brake drum and whether the cam be rotated clockwise or counter-clockwise. Another important feature is the simplicity and low expense of manufacturing and assembling the relatively few parts, which can be easily replaced if necessary.

Accordingly, the major object of the present invention is the provision of a novel, two shoe internal expanding brake assembly, in which the mechanical advantages of a cam, lever and strut assembly are utilized in an optimum manner to apply braking forces to the two brake shoes simultaneously.

Another object of the present invention is the provision of a novel floating brake actuating assemblage having a substantially direct application of actuating force by means of an actuating lever, cam and strut arranged in novel assembly.

Still another object of the present invention is the provision of novel floating mechanical brake actuating means capable of delivering a maximum of force to two brake shoes on an action-reaction principle involving no loss of force due to radial camshaft retainers.

Still another object of the present invention is the provision of a full floating brake actuating mechanism in which a cam, strut and shoe assembly is non-directional; that is, the cam can be rotated clockwise or counter-clockwise to actuate the brake, embodying the same parts.

A further object of the present invention resides in providing a novel brake mechanism in which an actuating lever, cam and strut are aligned, axially restrained, and supported by the cooperation between a backing plate and integral brake shoe abutment members.

A still further object of the present invention is the provision of a floating brake shoe mechanism having no internal adjusting means and in which excessive lining clearance can be eliminated by adjusting the external actuating linkage.

Other objects and novel features of this invention will become apparent from the following detailed description taken in conjunction with the claims and the accompanying drawings wherein:

FIGURE 4 is a section essentially along line 4—4 of FIGURE 1 showing the brake actuating means in detail;

FIGURE 5 is an enlarged fragmentary end view showing the cam and strut assembly of FIGURE 1; and FIGURE 6 is an enlarged view partly in section of the camshaft and backing plate assembly, particularly showing the relative bearing faces.

The same reference numerals indicate the same parts throughout the description.

Figure 1:
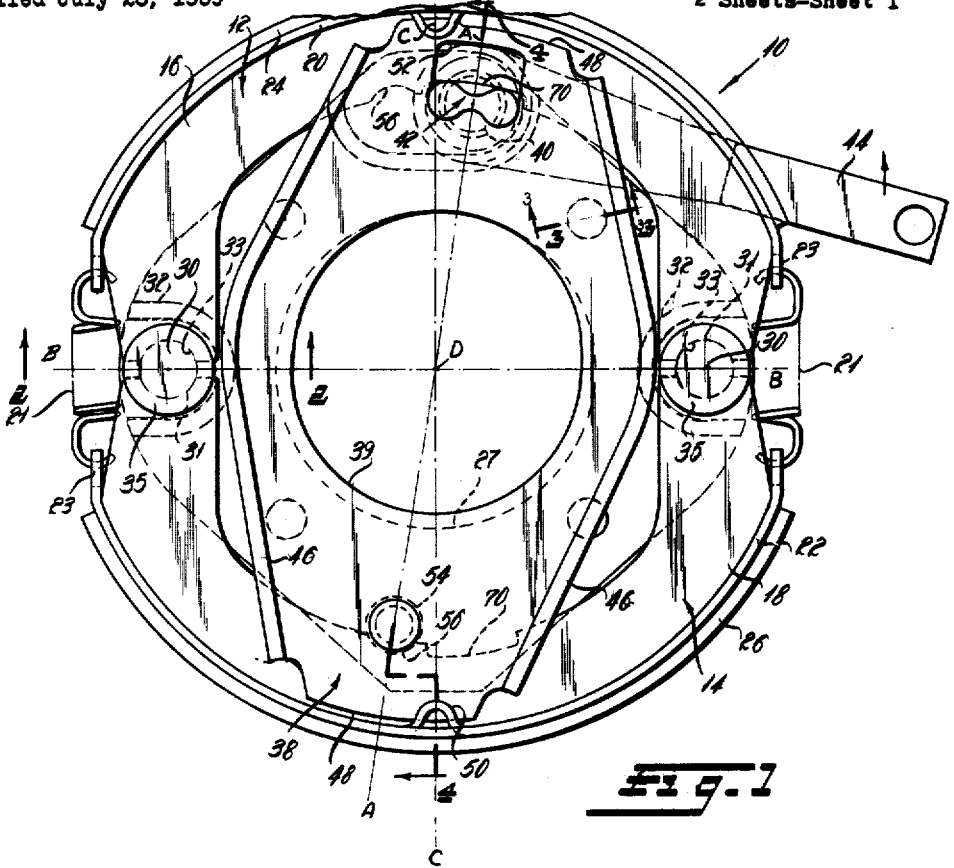
FIGURE 1 is an end elevation of an improved brake mechanism according to a preferred embodiment of this invention.

The improved brake assembly 10 provides a brake mechanism in which two identical and interchangeable brake shoes 12 and 14 are pivoted on both their ends and the brake shoe actuating means is located intermediate their ends to spread the brake shoes apart against the brake drum.

Brake shoes 12 and 14 comprise respectively webs 16 and 18 attached to the respective arcuate brake shoe platforms 20 and 22 on which linings 24 and 26 are riveted or bonded. The respective webs 16 and 18 of brake shoes 12 and 14 are anchored on diametrically opposite anchor pins 30 riveted to a backing plate 28. Each rivet 30 is formed with a cylindrical bearing surface 31 adapted to pivotally seat similar end sockets 33 on the shoe ends, and the pin 30 is turned over to provide axial retaining flange 35. Backing plate 28 is located within the brake drum 11 as shown in FIGURE 4 and cooperatively comprises a support for the brake actuating mechanism and has two inwardly directed abutment surfaces 32 in the vicinity of the anchor pins 30 (FIGURES 1 and 2) and another abutment surface or pad 37 (FIGURE 4) opposite the brake actuating mechanism. These three surfaces 32, 37 lie in a common vertical plane and serve to align the brake shoes 12 and 14 in cooperation with other means to be described hereafter.

A number of bolts 29 fasten backing plate 28 to the back of a change speed gear transmission housing or the like (not shown). A large center aperture 27 in plate 28 provides room for the transmission shaft (not shown) to extend therethrough, and another smaller aperture 34 above aperture 27 is formed in backing plate 28 in an outwardly indented section 36 thereof to support a camshaft 40 (FIGURE 4).

Figure 2:
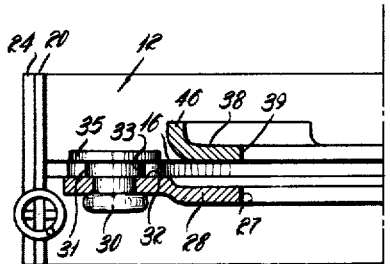
FIGURE 2 is a half section taken along line 2—2 of FIGURE 1 showing the anchor pin in detail.
Figure 3:
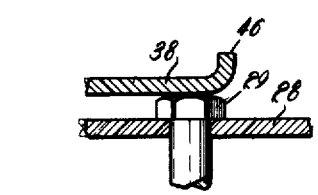
FIGURE 3 is another part section along line 3—3 of FIGURE 1 showing the fastening means of the backing plate in relation to the strut.

Brake shoes 12 and 14 are normally held retracted from the cylindrical inner surface of brake drum 11 by two coil return springs 21 secured to the adjacent opposite ends of brake shoes 12 and 14. Springs 21 are hooked onto end flanges 23 of the respective brake shoe platforms radially outwardly of anchor pins 30. Springs 21 are located offset from the vertical center of the brake adjacent the outside of the backing plate 28, as shown in FIGURE 4, to pull brake shoes 12 and 14 tightly against the anchors 30 and against pad 37 of the backing plate 28, thus cooperating to align the brake shoes. The reaction forces of return springs 21 are taken on the underside of the overhanging end flange 35 of anchor pins 30, which axially retains the shoes 12 and 14 on backing plate 28 as shown in FIGURE 2.

The brake actuating mechanism of the present invention comprises three parts. A full floating strut 38 having a large central aperture 39 is mounted adjacent and slidably abutting the brake shoe webs 16 and 18 and lies in a plane parallel to the webs and backing plate 28. Camshaft 40 extends transversely through backing plate aperture 34 and has an integral cam section 42. A lever 44 is non-rotatably secured to camshaft 40 as by splines 45 and is actuated to rotate the latter to actuate the brake mechanism. In FIGURE 4 the lever 44 is shown out of position for illustrating purposes.

Strut 38, cam 42, and lever 44 cooperate to expand the brake shoes 12 and 14 to frictionally contact the brake drum 11 when the brake is being actuated, exerting equal forces on both shoes.

The generally oval shaped strut 38 comprises a flat body stamping and is slightly offset at an angle from the brake shoe center line as shown in FIGURE 1. Strut 38 is provided along both lateral edges with an integral outturned flange 46 to add sufficient stiffness to its load carrying capacity. Both arcuate upper and lower edges 48 of the elongated strut 38 are flat to slidably abut against internal projections 50 struck out integrally from the brake shoe platforms 20 and 22. Projections 50 axially align and retain strut 38 so that the strut 38 and shoe webs 16 and 18 are always aligned with their adjacent surfaces slidably contacting in a common plane as illustrated in FIGURE 4. The projections 50 also aid in making shoe return springs 21 effective in aligning strut 38 by pressing the brake shoe webs 16 and 18 against the other side of the strut (FIGURE 4).

The actuation end of strut 38 has a contoured aperture 52 into which the contoured cam 42 extends to ride on the lower inner surface of aperture 52 as shown in FIGURE 5. The lower end of strut 38 is provided with a riveted on button 54 (FIGURES 1 and 4) which engages a semi-circular notch 56 in the shoe web 18 of brake shoe 14. Web 16 of brake shoe 12 is provided with a like notch 56.

In the preferred embodiment of the invention, a plane containing the axes of anchor pins 30 intersects the generally vertical actuation centerline of the brake assembly at an angle other than ninety degrees. This vertical actuation centerline essentially bisects strut 38 in a plane perpendicular to the paper in FIGURE 1 and is indicated at A. The generally horizontal anchor pin centerline is indicated at B. A centerline C in FIGURE 1 lies in a vertical plane perpendicular to the paper and bisecting the brake shoes, and lies at right angles to the anchor centerline B. The angle between centerlines A and C is preferably about 70° and is determined by the following considerations. All (A, B and C) intersect at the center of the drum indicated at D.

Applicants have discovered that in practice the relative angular location of the strut is important for attaining optimum dynamic effectiveness of this brake as a propeller shaft brake.

In a propeller shaft brake dynamic torque output is required only in the forward direction of drum rotation and static torque output is required in both rotative directions of the drum, forward and reverse. It is desirable to increase the dynamic torque output in the forward direction. The ideal situation is to locate the strut where the forward dynamic torque output is identical with the reverse static torque output, but in the particular disclosed brake this is not possible because of space requirements and like considerations. By angularly displacing the strut actuation centerline in the direction of propellor shaft rotation in forward drive as disclosed in the foregoing, the ideal situation is closely approached and the disclosure structure is substantially equally effective for both forward and reverse rotation. Actually the disclosed 7° offset provides a torque output distribution ratio of about 55–45 forward-reverse static torque and results in an increase of forward dynamic torque output to a point nearly equal to the reverse static torque output.

Cam 42 is formed with two transversely extending round lobes 58 and 60 connected by a straight land portion 62. Cam lobe 58 is rotatively seated in a recess 64 of strut aperture 52, and cam lobe 60 is rotatively seated in a corresponding strut aperture recess 66. The upper surfaces of cam lobes 58 and 60 abut against the inner surface 71 of an elongated recess 70 in brake shoe web 16 of brake shoe 12 adjacent the notch 56 to transmit reaction forces of the cam to the brake shoe. The other brake shoe web 18 of brake shoe 14 is provided with a similar recess 70 to make both shoes interchangeable.

Aperture 52 of strut 38 extends upwardly sufficiently to provide room for the necessary rotation of cam 42.

Cam 42, which is an integral part of the cam shaft 40, terminates rearwardly into a boss 72 which is axially restrained between brake shoe web 16 and the supporting part 36 of backing plate 28 (FIGURE 6) providing a shoulder 74 to serve as a bearing face against surface 77 of supporting section 36 and a face 76 to serve as a bearing face against brake shoe web 16, cooperating with pads 32 and 37 to align and retain brake shoes 12 and 14 in proper relation to the brake assembly.

Boss 80 of lever 44 is axially secured to the threaded end of camshaft 40 as by a lock nut assembly 84 and the lever may be attached to any conventional brake actuating linkage (not shown). Locknut assembly 84 not only retains lever 44 on the camshaft but also retains the backing plate 28 between the shoulder 74 of boss 72 and the side of lever boss 80 without restricting the ability of the cam and lever assembly to adjust inside the enlarged aperture 34. It will be noted within aperture 34 camshaft 40 is formed with a cylindrical bearing section 79 having a small radial float within aperture 34.

The camshaft 40 is axially aligned and retained by the shoulder 74 of camshaft boss 72 abutting surface 77 of the camshaft supporting plate section 36 and the flat end 78 of lever boss 80 abutting surface 81 of section 36, as shown in FIGURE 6.

Aperture 34 has been made slightly larger in diameter than the camshaft 40 so that the cam 42 may readily center itself between the strut 38 and shoe 12 which are being acted upon directly by the cam to apply equal forces to both brake shoes. The oversize of aperture 34 permits this and allows the cam to slide or float, which is an important feature of the present invention. The cam 42 and lever 44, which are slidingly clamped to the backing plate 28, exert only axial forces with no radial forces to restrain them for the reason that the camshaft 40 is not journalled in backing plate 28, as will be seen from FIGURE 6.

Radial adjustment of the camshaft 40 is provided by bearing face 70 of shoe web 16 and bearing faces 64 and 66 of the strut 38 acting in opposite directions on the cam lobes 58 and 60. Those oppositely acting forces would tend to tip the cam 42, but this tendency is overcome by the bearing faces 74, 77 and 78, 81, in cooperation with the clamping effect of locknut 84 acting in axial direction, which forces the cam to move only radially. The clamping effect of locknut 84, which holds the actuating assembly together, is such that a friction force is provided between bearing faces 74, 77 and 78, 81 which holds the cam and lever assembly in a fixed position relative to the strut and shoe assembly to obtain proper running clearance between the brake shoes and the drum. This friction force, acting on the camshaft supporting section 36, does not restrict the self-aligning ability of camshaft 40 in aperture 34, and is easily overcome by the equalizing effect of the applied actuating force and cam output force. In the initial installation of the brake, a light film of lubricant may be applied to the bearing faces 77, 81 on both sides of camshaft supporting plate section 36. Thus a perfect combination of axial and radial alignment has been achieved, where the axial functions are provided by the cam and lever parts and the radial functions by the strut and shoe parts.

In operation, the invention functions in the following manner. Pulling the lever 44 in the direction of the arrow in FIGURE 1 rotates the cam 42 (FIGURE 5) clockwise (anti-clockwise in the illustration) essentially about the axis of shaft 40, which causes cam lobe 58 to rock in recess 64 and exert a downwardly directed pressure on strut 38. Cam lobe 60 at the same time exerts an equal, but, opposite pressure against the bearing face 70 of brake shoe 12. The downwardly directed force on strut 38 is transferred by means of the button 54 to brake shoe 14. Thus the brake shoes are spread apart against the brake drum 11 by a force acting on a line through the cam lobes and button 54, creating an action-reaction type of actuation with practically no loss of force, made possible by the free camshaft and floating cam which are not radially restrained in the brake support backing plate. Both brake shoes move off their anchor pins 30 with the rotating drum carrying the engaged shoes back to one anchor pin. Rotating the lever 44 in the opposite direction achieves a similar actuation of the brake mechanism with the exception that cam lobe 60 exerts pressure on the strut 38 and cam lobe 58 exerts pressure against the brake shoe 12.

The brake shoes 12 and 14 and strut 38 are held in perfect alignment during actuation by means of the three pads 32, 37 of the backing plate and pad 76 of the cam boss 72, which all lie in a common vertical plane. Axial misalignment of shoes and strut during actuation is furthermore restricted by action of the offset return springs 21 which pull the brake shoe webs 16 and 18 against the anchors 30, on which they are restrained by the overhanging flanges 35, and down on the pads 32 of backing plate 28 and pad 76 of boss member 72. The projections 50 of the shoe platforms 20 and 22 axially align the strut 38 so that the strut and shoe webs 16 and 18 are always slidingly engaged in a common plane, achieved by the return springs 21 which are offset from the vertical centerline of the brake.

The camshaft 40 is axially restrained during actuation by the face 74 of boss 72 (FIGURE 6) bearing against flat vertical surface 77 of the camshaft supporting section 36 of backing plate 28, and the plate side 78 of lever boss 80 bearing against the flat vertical surface 81 of supporting section 36. Thus, the brake components are held in perfect alignment by a simplicity of the arrangement of the parts and bearing members.

In releasing the brake, the return springs 21 return the brake shoes 12 and 14 and strut 38 to their original position. As shown in FIGURES 1 and 4, elongated center aperture 39 extends in the direction of the longitudinal axis of the strut 38 of the brake to provide room for the displacement of the strut during actuation.

Thus, there has been provided a balanced, floating mechanical brake actuation mechanism having an overall input ratio independent of lining thickness, lever stroke length, or space requirements within the brake, which provides a most satisfactory brake output from a given input achieved by the fact that no forces are lost due to the free floating brake actuating camshaft. The simplicity achieved in accomplishing the functions of adjustment of shoe clearance, perfect aligning of all brake parts and of the mechanical actuating mechanism, and the simple arrangement of brake shoe abutments, provides an efficient and long lasting brake.

Manufacturing costs are greatly reduced by incorporating relatively few parts, in which both brake shoes are identical and interchangeable, and wherein the cam, shoe and strut assembly to actuate to the brake is non-directional; that is, the cam can be rotated clockwise or counter-clockwise to actuate the brake, without the necessity of rearranging or reversing parts in the brake mechanism.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake assembly, a relatively fixed support having shoe engaging surfaces lying in a plane, opposed anchor pins on said support, two brake shoes adapted for end engagement with said anchor pins and having webs adapted on one side to slidingly engage said support surfaces, a strut having bearing engagement with one of said shoes radially in the assembly and extending across the assembly generally parallel to said brake shoe webs with one side adapted to slidingly engage the other sides of the shoe webs, cooperating means on said strut and said brake shoe webs for restraining said strut against axial displacement, an actuator, and means operably connecting said actuator to said strut and the other shoe.

2. In a brake shoe assembly, a support having an aperture, an actuator comprising a rotatable shaft extending through said aperture and having predetermined radial float therein, means on said shaft permitting shaft rotation but restraining axial displacement of the shaft with respect to the support, anchor pins on said support, two brake shoes having end engagement with said pins, means axially locating said shoes in the assembly comprising webs on the shoes slidably engaging coplanar surfaces on said support and shaft, a strut axially restrained in sliding engagement with said shoe webs on the side opposite said surfaces, an actuator cam on said shaft having bearing engagement with said strut and one of said shoes, and a motion transmitting connection between the strut and the other shoe.

3. In the assembly defined in claim 2, means for axially adjusting said shaft.

4. In a brake assembly, a pair of brake shoes movably mounted and resiliently urged toward opposite end engagement with diametrically opposite anchor means, a shiftably mounted rigid strut extending substantially parallel to the direction of shoe movement and overlying the shoes at regions lying on opposite sides of a line joining said anchor means, a rotatably mounted actuator cam operably interposed between an edge of said strut and one of said brake shoes, means on the strut having a rocking bearing connection with the other brake shoe, means for rotating said cam about an axis substantially perpendicular to the direction of shoe movement to expand said shoes in brake applying direction, the line of actuation of said strut with respect to said shoes lying in a plane disposed at an angle other than ninety degrees with respect to an intersecting plane containing said line joining the anchor means, so that torque outputs substantially equally effective for either forward or reverse rotation are obtained upon application of the brake.

5. In a brake assembly, a relatively fixed support having shoe engaging surfaces lying in a plane, opposed anchor pins on said support, two brake shoes adapted for end engagement with said anchor pins and having webs adapted on one side to slidingly engage said support surfaces, a strut having bearing engagement with one of said shoes radially in the assembly and extending across the assembly generally parallel to said brake shoe webs with one side adapted to slidingly engage the other sides of the shoe webs, coacting means on said strut and each brake shoe restraining said strut from axial movement with respect to said brake shoes, and an actuator comprising cam means projecting into engagement with associated radially spaced bearing surfaces on said other shoe and said strut respectively.

6. In a brake assembly, a relatively fixed support having shoe engaging surfaces lying in a plane, said support being formed with an aperture, opposed anchor pins on said support, two brake shoes adapted for end engagement with said anchor pins and having webs adapted on one side to slidingly engage said support surfaces, a strut having bearing engagement with one of said shoes radially in the assembly and extending across the assembly generally parallel to said brake shoe webs with one side adapted to slidingly engage the other sides of the shoe webs, an actuator comprising a rotatable shaft extending freely through said aperture, said aperture being sufficiently larger than said shaft that said actuator is mounted for predetermined limited radial float with respect to said support, and a cam fixed on said shaft having aaxially spaced transversely opposed reaction faces bearing on said strut and said other shoe respectively.

7. In a brake assembly, two brake shoes each having a radial web, a support on which said shoes are relatively movably mounted, means resiliently urging said shoes into retracted position, means for expanding said shoes to drum engaging position comprising an actuator extending through an aperture in said support, said aperture being slightly larger than the portion of said actuator extending therethrough so that said actuator is mounted for rocking movement and predetermined limited radial float, means axially locating said shoes with respect to said support comprising aligned planar surfaces on said support and said actuator, said resilient means being offset with respect to the plane containing said aligned planar surfaces for urging said shoe webs toward said surfaces, cooperating means on the actuator and support for restraining said actuator against axial displacement while permitting said radial float, and force transmitting means operatively connecting said actuator to the respective shoes.

8. A brake assembly comprising a support, at least two brake shoes movably mounted on said support, each brake shoe having a radial web, means resiliently urging said brake shoes toward each other into retracted position, means for relatively moving said brake shoes into engaged position with a surrounding drum comprising a strut mounted for floating movement radially in the assembly and extending in the direction of movement of said shoes and an actuator comprising rotatable cam means having opposed reaction faces bearing on one of said shoes and the strut, said cam means comprising a shaft extending through a support aperture sufficiently larger in diameter than the shaft to permit predetermined limited radial float of said cam during brake actuation, means axially locating said shoes with respect to said support comprising aligned planar surfaces on said support and said shaft, said resilient means being offset with respect to the plane of said planar surfaces for urging said shoe webs toward said surfaces, a force transmitting connection between said strut and the other brake shoe and cooperating relatively slidable means on said strut and said brake shoes for restraining said strut against axial displacement while permitting said floating movement.

9. In a brake assembly, a support, substantially diametrically opposite anchor means on said support, two brake shoes, each shoe having a web adapted to have end bearing engagement with said anchor means, resilient means connecting adjacent brake shoe ends for urging them toward said anchor means, means for separating said shoes and displacing them toward a surrounding drum comprising a strut mounted on said support for movement substantially parallel to said shoes, cooperating relatively slidable means on the strut and shoes for restraining said strut against axial displacement while permitting said strut movement, an actuator on said support, means axially locating said shoes with respect to said support comprising aligned planar surfaces on said support and actuator, said resilient means being offset with respect to the plane containing said planar surfaces for urging said shoe webs toward said planar surfaces, motion transmitting connections between said actuator and said strut and one of said shoes, and a motion transmitting connection between the strut and the other shoe, said connections providing a shoe separating force acting substantially in a line that lies in a plane which intersects a plane normal to and bisecting said brake shoe at a small acute angle.

10. In a brake assembly, a relatively fixed support having shoe engaging surfaces lying in a plane, said support being formed with an aperture, opposed anchor pins on said support, two brake shoes adapted for end engagement with said anchor pins and having webs adapted on one side to slidingly engage said support surfaces, a strut having bearing engagement with one of said shoes radially in the assembly and extending across the assembly generally parallel to said brake shoe webs with one side adapted to slidingly engage the other sides of the shoe webs, an actuator comprising a rotatable shaft extending freely through said aperture, said aperture being sufficiently larger than said shaft that said actuator is mounted for predetermined limited radial float with respect to said support, means axially locating said shoes with respect to said support comprising aligned planar faces on said support and said shaft, and a cam fixed on said shaft having axially spaced transversely opposed reaction faces bearing on said strut and said other shoe respectively.

11. In a brake assembly, a relatively fixed support having shoe engaging surfaces lying in a plane, said support being formed with an aperture, opposed anchor pins on said support, two brake shoes adapted for end engagement with said anchor pins and having webs adapted on one side to slidingly engage said support surfaces, a strut having bearing engagement with one of said shoes radially in the assembly and extending across the assembly generally parallel to said brake shoe webs with one side adapted to slidingly engage the other sides of the shoe webs, an actuator comprising a rotatable shaft extending freely through said aperture, said aperture being sufficiently larger than said shaft that said actuator is mounted for predetermined limited radial float with respect to said support, means axially locating said shoes with respect to said support comprising aligned planar faces on said support and said shaft, offset resilient means interconnecting the adjacent shoe ends urging said shoes into engagement with said anchor pins and said shoe webs toward said aligned planar surfaces on said support and said shaft, and a cam fixed on said shaft having axially spaced transversely opposed reaction faces bearing on said strut and said other shoe respectively.

References Cited in the file of this patent

UNITED STATES PATENTS

| | | |
|---|---|---|
| 1,851,737 | Stoner | Mar. 29, 1932 |
| 1,876,089 | St. James | Sept. 6, 1932 |
| 1,922,778 | Poppe | Aug. 15, 1933 |
| 2,030,272 | Schnell | Feb. 11, 1936 |
| 2,192,012 | La Brie | Feb. 27, 1940 |
| 2,886,141 | House | May 12, 1959 |
| 2,932,366 | Williams | Apr. 12, 1960 |

FOREIGN PATENTS

| | | |
|---|---|---|
| 924,728 | Germany | Mar. 7, 1955 |

UNITED STATES PATENT OFFICE

CERTIFICATE OF CORRECTION

Patent No. 3,081,844                                           March 19, 1963

George P. Mathews et al.

It is hereby certified that error appears in the above numbered patent requiring correction and that the said Letters Patent should read as corrected below.

Column 1, line 70, for "embodying" read -- employing --; column 3, line 57, for "70°" read -- 7° --; column 7, line 22, for "aaxially" read -- axially --.

Signed and sealed this 19th day of November 1963.

(SEAL)
Attest:

ERNEST W. SWIDER

Attesting Officer

EDWIN L. REYNOLDS

Acting Commissioner of Patents